US009135076B2

(12) United States Patent
Apte et al.

(10) Patent No.: US 9,135,076 B2
(45) Date of Patent: Sep. 15, 2015

(54) AUTOMATED CAPACITY AWARE PROVISIONING

(71) Applicant: Caplan Software Development S.r.l., Milan (IT)

(72) Inventors: Sudheer Apte, Walpole, MA (US); Marco Bertoli, Trecate (IT); Stefano Visconti, Brenta (IT); Kanika Dhyani, Cologono Monzese (IT); Gabriele Maggioni, Corbetta (IT)

(73) Assignee: Caplan Software Development S.r.l., Milan (IT)

( * ) Notice: Subject to any disclaimer, the term of this patent is extended or adjusted under 35 U.S.C. 154(b) by 259 days.

(21) Appl. No.: 13/630,852

(22) Filed: Sep. 28, 2012

(65) Prior Publication Data

US 2014/0095693 A1    Apr. 3, 2014

(51) Int. Cl.
G06F 15/173    (2006.01)
G06F 9/50    (2006.01)
H04L 29/08    (2006.01)

(52) U.S. Cl.
CPC .............. *G06F 9/505* (2013.01); *H04L 67/101* (2013.01); *H04L 67/1004* (2013.01); *H04L 67/1008* (2013.01); *H04L 67/1012* (2013.01); *H04L 67/22* (2013.01); *G06F 2209/508* (2013.01)

(58) Field of Classification Search
CPC .............. H04L 67/322; H04L 67/1004; H04L 67/1008; H04L 67/101; H04L 67/1012; G06F 9/505; G06F 9/5083

USPC .......................................................... 709/224
See application file for complete search history.

(56) References Cited

U.S. PATENT DOCUMENTS

| 7,320,131 | B1 * | 1/2008 | O'Toole, Jr. .................. 718/104 |
| 7,702,779 | B1 * | 4/2010 | Gupta et al. .................. 709/224 |
| 2007/0124431 | A1 * | 5/2007 | Sharma ........................ 709/219 |

OTHER PUBLICATIONS

"Load balancing (computing)", Wikipedia, Retrieved on Sep. 19, 2012, pp. 1-7. Available at: http://en.wikipedia.org/wiki/Load_balancing_(computing).

* cited by examiner

*Primary Examiner* — Yves Dalencourt
(74) *Attorney, Agent, or Firm* — Brake Hughes Bellermann LLP

(57) ABSTRACT

According to one general aspect, a method may include monitoring, via a communications network, an actual system resource usage of each of a plurality of target computing devices configured to execute one or more respective workload tasks. The method may also include receiving a request for a suggestion for an assigned target computing device to be assigned a new workload task. The method may further include providing the suggestion regarding the assigned target computing device to be assigned a new workload task, wherein the suggestion suggests one or more target computing device(s) that is included in the plurality of target computing devices. The method may also include adjusting a system resource usage profile of the assigned target computing device to include an estimated system resource usage for the new workload task and an actual system resource usage of the assigned target computing device that was previously monitored.

20 Claims, 4 Drawing Sheets

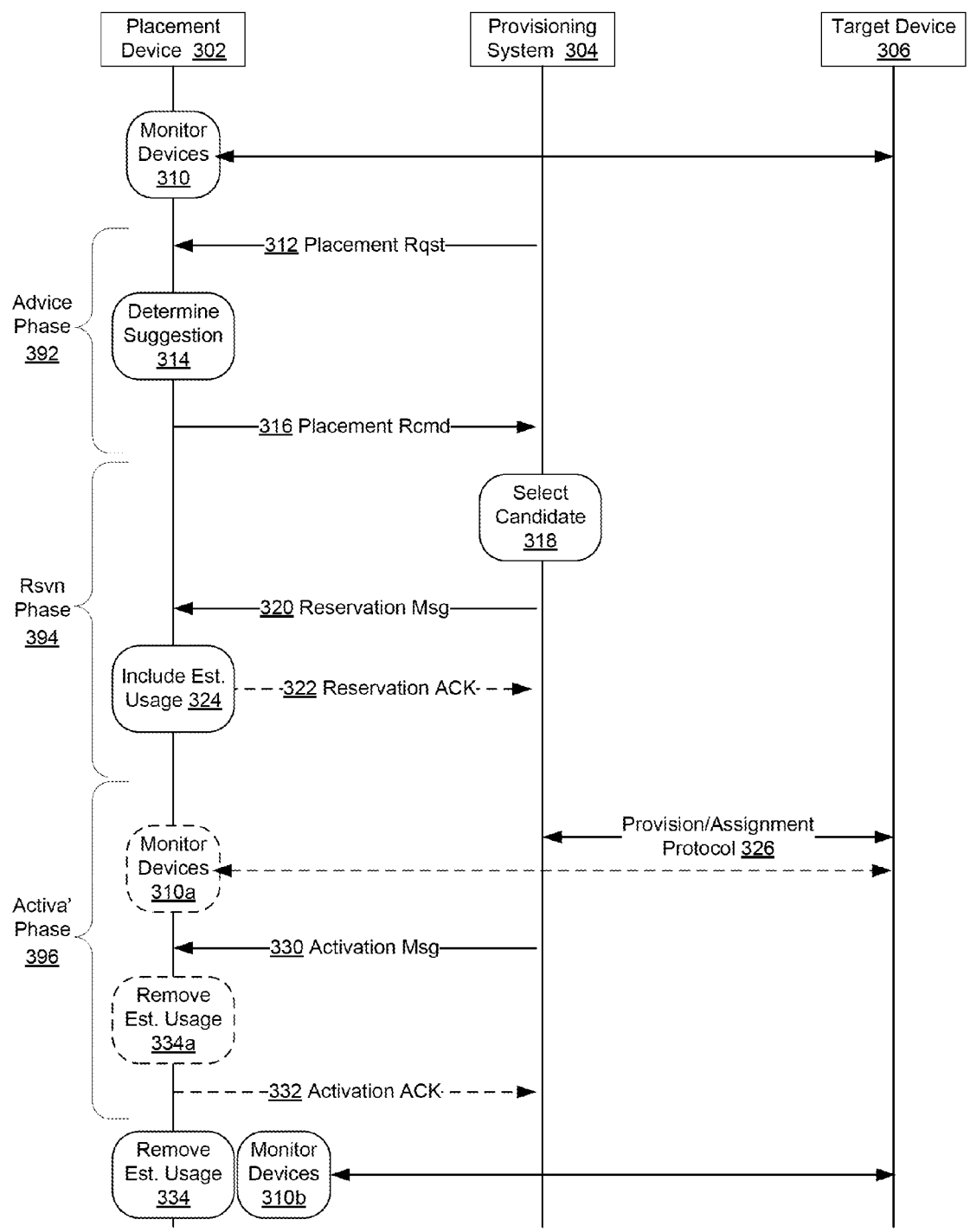

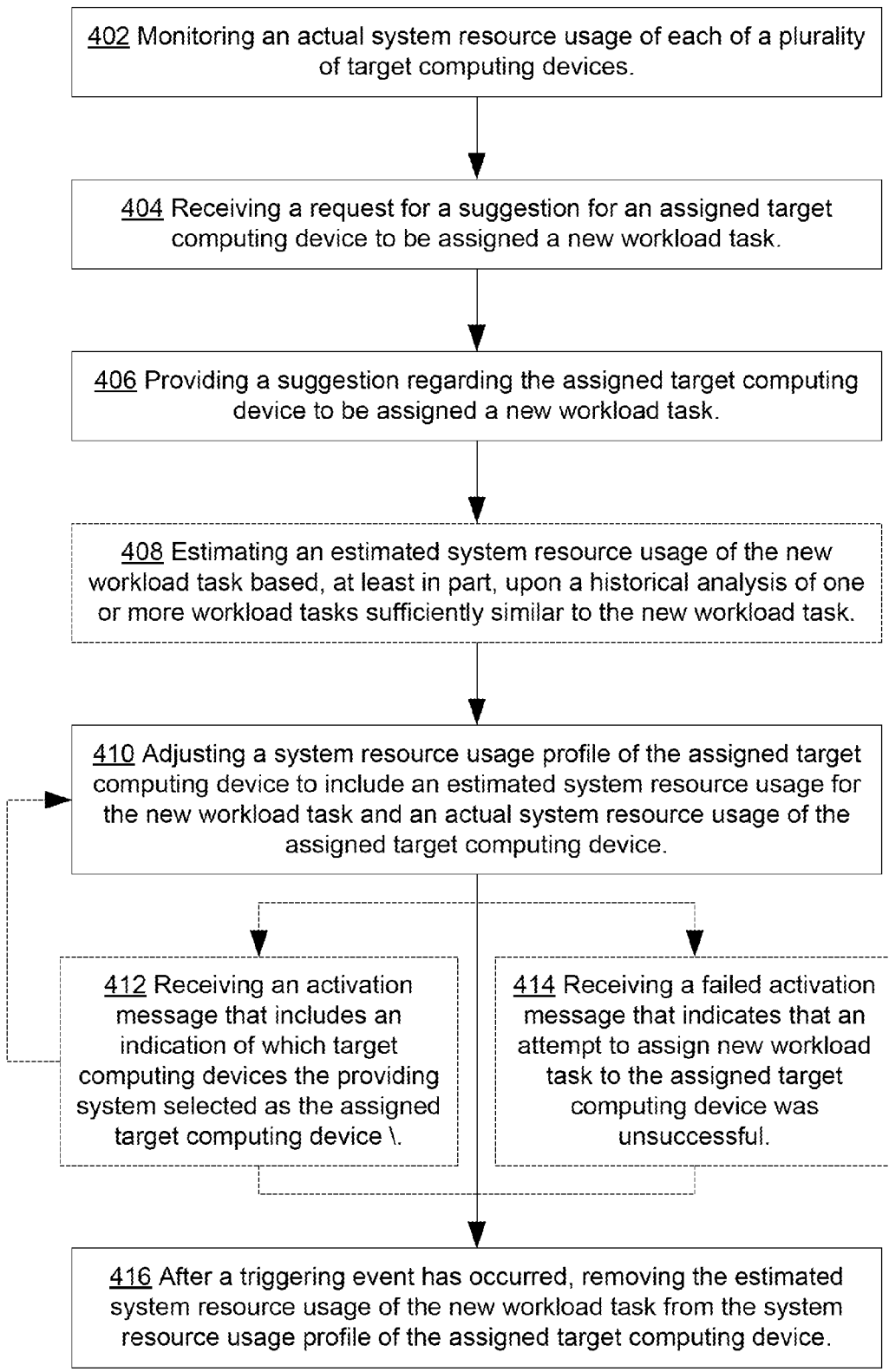

US 9,135,076 B2

AUTOMATED CAPACITY AWARE PROVISIONING

TECHNICAL FIELD

This description relates to managing a plurality of network resources and more specifically to provisioning tasks to the network resources based upon capacity.

BACKGROUND

Load balancing is generally a computer networking methodology to distribute workload across multiple computing devices or a computer cluster, network links, central processing units, disk drives, or other resources, to ideally achieve optimal resource utilization, maximize throughput, minimize response time, and avoid overload. Using multiple components with load balancing, instead of a single component, often increases reliability through redundancy. A load balancing service is usually provided by dedicated software or hardware, such as, for example, a multilayer switch or a Domain Name System server, etc.

Often when provisioning or assigning resources for new services or workloads within a cloud infrastructure or network system, the management software needs to ensure there is enough capacity (e.g., processing capacity, memory capacity, storage capacity, bandwidth capacity, etc.), and find a sufficiently suitable place or computing device for new workloads.

Generally, network engineers are concerned with questions regarding how to take into account the capacity of system resources (e.g., processing capacity, memory capacity, etc.) in the "target hosts" or target computing devices in the infrastructure. Often one must determine an estimate whether there is enough capacity in the various given target computing devices, and to locate the best placement for candidate workloads. Often a "placement engine" cannot provide accurate advice because of, for example, an uncertainty in the actual current performance of the target hosts in a dynamic environment where many workloads are being added and removed, and the demand for system resources often changes depending on the business or network activity. Frequently, performance data is collected about the hosts or target computing devices, but there is a time lag between the last data collection and the time at which the placement advice is needed. In this time period, numerous workloads may already have been provisioned or assigned in a dynamic cloud environment, causing the actual performance of the target hosts to change. These and other difficulties make the proper placement or assignment of a new workload to a target computing device difficult.

SUMMARY

According to one general aspect, a method may include monitoring, via a communications network, an actual system resource usage of each of a plurality of target computing devices, where each of the target computing devices is configured to execute one or more respective workload tasks. The method may also include receiving, from a provisioning system, a request for a suggestion for an assigned target computing device to be assigned a new workload task. The method may further include providing to the provisioning system, the suggestion regarding the assigned target computing device to be assigned a new workload task, wherein the suggestion suggests one or more target computing device(s) that is included in the plurality of target computing devices. The method may also include adjusting a system resource usage profile of the assigned target computing device to include an estimated system resource usage for the new workload task and an actual system resource usage of the assigned target computing device that was previously monitored.

According to another general aspect, an apparatus may include a network interface and a processor. The network interface may be configured to receive monitoring messages of an actual system resource usage of each of a plurality of target computing devices, where each of the target computing devices is configured to execute one or more respective workload tasks, receive, from a provisioning system, a request for a suggestion for an assigned target computing device to be assigned a new workload task, and provide to the provisioning system, the suggestion regarding the assigned target computing device to be assigned a new workload task, wherein the suggestion suggests one or more target computing device(s) included in the plurality of target computing devices. The processor may be configured to adjust a system resource usage profile of the assigned target computing device to include an estimated system resource usage for the new workload task and an actual system resource usage of the assigned target computing device that was previously monitored.

According to another general aspect, a computer program product for recommending a target computing system may be tangibly and non-transitorily embodied on a computer-readable medium. The computer program product may include executable code that, when executed, is configured to cause an apparatus to monitor, via a communications network, an actual system resource usage of each of a plurality of target computing devices, where each of the target computing devices is configured to execute one or more respective workload tasks; receive, from a provisioning system, a request for a suggestion for an assigned target computing device to be assigned a new workload task; provide to the provisioning system, the suggestion regarding the assigned target computing device to be assigned a new workload task, wherein the suggestion suggests one or more target computing devices included in the plurality of target computing devices; and adjust a system resource usage profile of the assigned target computing device to include an estimated system resource usage for the new workload task and an actual system resource usage of the assigned target computing device that was previously monitored.

The details of one or more implementations are set forth in the accompanying drawings and the description below. Other features will be apparent from the description and drawings, and from the claims.

A system and/or method for improving a network computing infrastructure, substantially as shown in and/or described in connection with at least one of the figures, as set forth more completely in the claims.

BRIEF DESCRIPTION OF THE DRAWINGS

FIG. 3 is a timing diagram of an example embodiment of a system in accordance with the disclosed subject matter.

FIG. 4 is a flowchart of an example embodiment of a technique in accordance with the disclosed subject matter.

Like reference symbols in the various drawings indicate like elements.

DETAILED DESCRIPTION

Figure 1:
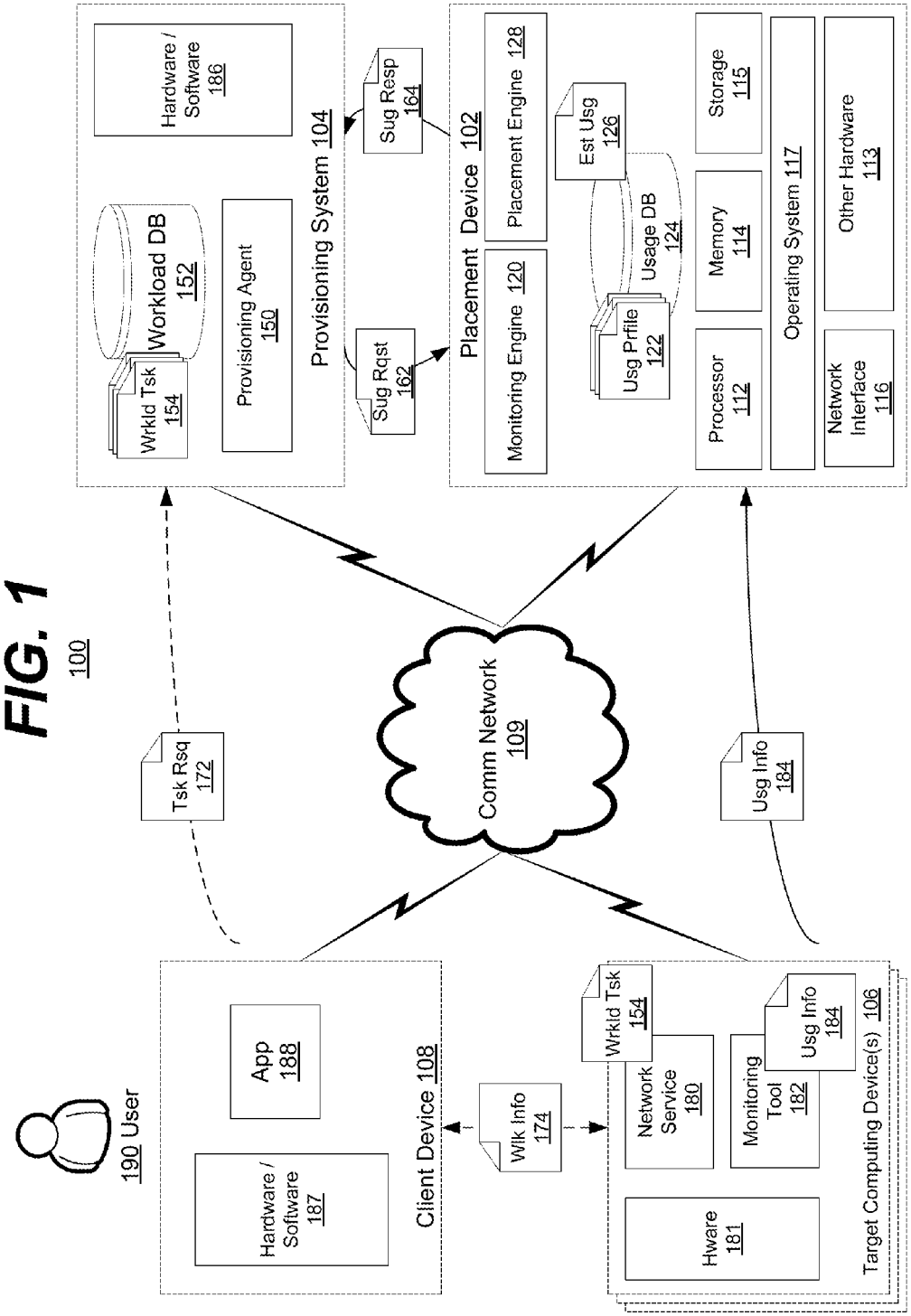
FIG. 1 is a block diagram of an example embodiment of a system in accordance with the disclosed subject matter.
Figure 2:
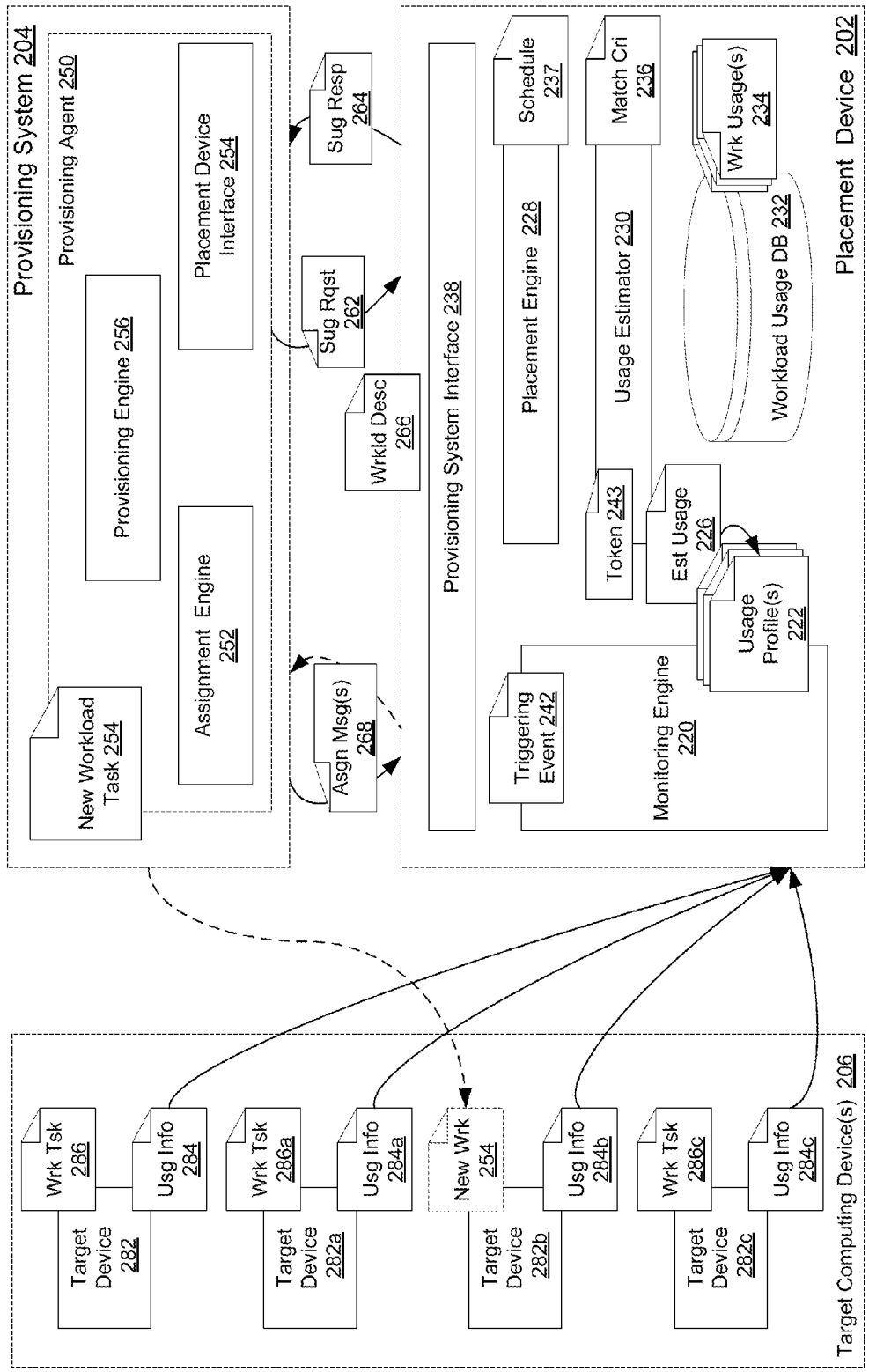
FIG. 2 is a block diagram of an example embodiment of a system in accordance with the disclosed subject matter.

FIG. 1 is a block diagram of an example embodiment of a system 100 in accordance with the disclosed subject matter. It is noted that the system 100 of FIG. 1 is simplified for illustrative purposes and that the system 200 of FIG. 2 illustrates another embodiment in which more detail of certain aspects of the disclosed subject matter are provided.

In one embodiment, the system 100 may include a placement device 102, a provisioning system 104, a plurality of target computing device 106, and a communications network 109 (e.g., the Internet, an intranet, etc.). In some embodiments, the system 100 may also include a client device 108. In various embodiments, the provisioning system 104 and the placement device 102 may be integrated into a single device. In yet another embodiment, a placement device 102 may support a plurality of provisioning systems 104 (only one illustrated). It is understood that the above are merely a few illustrative examples to which the disclosed subject matter is not limited.

In various embodiments, the target computing devices 106 may each include a computing device, such as, for example, as laptops, desktops, workstations, personal digital assistants, servers, blade servers, mainframes, and other appropriate computers, etc. or a virtual machine thereof. In some embodiments, the target computing devices 106 may each be configured to execute or provide one or more network services 180. In such an embodiment, the network services 180 may include one or more of a number of network services such as, for example, web site hosting, remote storage, data processing, distributed computing, code compilation, etc. It is understood that the above are merely a few illustrative examples to which the disclosed subject matter is not limited. In various embodiments, the network services 180 may be homogenous or heterogeneous. Likewise, in various embodiments, the various target computing devices 106 may be homogenous or heterogeneous.

In the illustrated embodiment, the network services 180 may be assigned to execute or perform various workload tasks 154. In such an embodiment, the workload task 154 may include a job or series of instructions that may be performed by the network service 180. For example, a workload task 154 may include retrieving a web page from a web server network service, storing a set of backup data via a remote storage network service, solving a portion of a computing problem via distributed computing network service, etc. It is understood that the above are merely a few illustrative examples to which the disclosed subject matter is not limited.

In the illustrated embodiment, the system 100 may assign a workload task 154 to a particular target computing device 106 with the aid of a placement device 102. In such an embodiment, the placement device 102 may be configured to monitor the usage of the respective system resources (processor capacity, memory usage, available storage, bandwidth capacity, type or state of network service, etc.) of the target computing device 106. In some embodiments, the placement device 102 may also be configured to suggest that one or more of these target computing devices 106 be assigned or provisioned with a given workload task 154.

In various embodiments, the placement device 102 may include a computing device, such as, for example, as laptops, desktops, workstations, personal digital assistants, servers, blade servers, mainframes, and other appropriate computers, etc. or a virtual machine thereof. In various embodiments, the placement device 102 may be used by a user (not shown). In various embodiments, the placement device 102 may include a processor 112 configured to execute one or more machine executable instructions or pieces of software, firmware, or a combination thereof. The placement device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the placement device 102 may include a storage medium 115 configured to store data in a semi-permanent or substantially permanent form. In various embodiments, the storage medium 115 may be included by the memory 114.

In various embodiments, the placement device 102 may include one or more network interfaces 116 configured to allow the placement device 102 to be part of and communicate via a communications network 109. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the placement device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In various embodiments, the placement device 102 may include an operating system (OS) 117 configured to provide one or more services to an application and manage or act as an intermediary between the application and the various hardware components (e.g., the processor 112, a network interface 116, etc.) of the placement device 102. In such an embodiment, the placement device 102 may include one or more native applications, which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotkey, etc.) or a virtual machine (e.g., the Java Virtual Machine, the Microsoft Common Language Runtime, etc.) that are configured to translate source or object code into executable code which is then executed by the processor 112.

In one embodiment, the OS 117 may allow the application access to various system resources (e.g., access to the storage medium 116, access to a camera, access to a location sensor, draw a user interface (UI) on a display/monitor, etc.) to perform various application functions (e.g., contact a web site, take a picture, read/write a file, etc.).

In such an embodiment, the placement device 102 may include a monitoring engine 120 configured to monitoring the usage or capacity of one or more system resources of the target computing devices 106. In various embodiments, the target computing devices 106 may include various pieces of hardware 181 analogous to or similar to the hardware (e.g., processor 112, memory 114, etc.) those of the placement device 102, as described above. In addition each target computing device 106 may include various pieces of software (e.g., OS, network service 180, etc.). In such an embodiment, the monitoring engine 120 my monitor how the target computing device 106 is using these hardware and/or software system resources or how much of these system resources are not being used or are otherwise deemed "available for use".

In some embodiments, the target computing device 182 may include a monitoring tool 182 configured to record or monitor the system resources of the respective target computing device 106. The monitoring tool 182 may then provide the system resource usage information 184 to the placement device 102. In some embodiments, the monitoring tool 182 may be included as part of the operating system (not explicitly shown) of the targeting computing device 106. In another embodiment, the monitoring tool 182 may be included as part of another piece of software (e.g., networking service 180) or hardware. In yet another embodiment, the monitoring tool 182 maybe a separate entity included by the target computing device 106 or a monitor external to the target computing device 106 (e.g., a router or switch that measures bandwidth, etc.). In some embodiments, the monitoring tool 182 may include a number of separate monitoring tools (e.g., a memory meter, a bandwidth monitor, a free storage space reporting service, etc.). It is understood that the above are merely a few illustrative examples to which the disclosed subject matter is not limited.

In various embodiments, this various monitoring tools of the targeting computing devices 106 may provide system resource usage information 184 periodically. In another embodiment, the information 184 may be provided in response to a request from the placement device 102 (wherein the request may be periodic but in other embodiments may not be). In some embodiments, the information 184 may be provided when a threshold value (e.g., in either absolute or relative terms, etc.) is exceeded or a triggering event occurs (e.g., free storage space falls below a threshold, processor usage jumps or falls be a certain percentage, etc.). In various embodiments, the information 184 may be provided in an asynchronous fashion, in a fashion in which each target computing device 106 acts synchronously but wherein the plurality of target computing devices 106 are not synchronized together, in synchronous fashion, or a combination thereof. It is understood that the above are merely a few illustrative examples to which the disclosed subject matter is not limited.

In the illustrated embodiment, the monitoring engine 120 may create a system resource profile 122 for each of the target computing devices 106. In various embodiments, these system resource profiles 122 may be updated or altered as new system resource usage information 184 is made available. In some embodiments, the system resource usage profiles 122 may include static system resource information (e.g., processor type, installed software, etc.) that is not include in the system resource usage information message or update 184. In such an embodiment, the static system resource information may be manually configured, acquired as part of a startup or initial system resource usage information message 184, as part of a special system resource usage information message 184, acquired outside of the system resource usage information message 184 scheme, etc. It is understood that the above are merely a few illustrative examples to which the disclosed subject matter is not limited.

In some embodiments, a system resource usage profile may be created for the plurality of target computing devices 106 as a whole or as sub-portions or groups. In various embodiments, the system resource profiles 112 may be stored within a usage database (DB) or repository 124. In some embodiments, this usage DB 124 may be stored within the storage medium 115 or the memory 114. In various embodiments, this usage DB 124 may also include the various system resource usage information sets or messages 184 collected from the target computing devices 106 either in whole or in part or information derived therefrom. In some embodiments, the usage DB 124 may include historical system resource usage information or profiles which may be used for purposes described below in reference to FIG. 2.

At this point, an example of the usage of the system 100 may provide illustrative. As such, in one embodiment, a user 190 may make use of a client computing device 108. In various embodiments, the client device 106 may include a computing device, such as, for example, a shared computing terminal, a desktop personal computer, a laptop, a netbook, a tablet, a smartphone, etc. or a virtual machine thereof. In various embodiments, the client device 108 may include hardware and software 187 analogous or similar to that described in reference to the hardware and software of placement device 102. Further, in the illustrated embodiment, the client device 108 may include an application 188 (e.g., a web browser, a business application, etc.).

In the illustrated embodiment, the user 190, client device 108, or the application 188 may request (via workload task request message 172) that a target computing device 106 perform a certain workload task 154. For example, in one embodiment, a web browser 188 may request that a web server 180 provide the web browser 188 with a web page (e.g., workload information 174). It is understood that the above is merely one illustrative example to which the disclosed subject matter is not limited.

In the illustrated embodiment, system 100 may include a provisioning system 104 configured to assign a workload task 154 to one of the plurality of target computing device 106. In various embodiments, provisioning system 104 may include a computing device, such as, for example, as laptops, desktops, workstations, personal digital assistants, servers, blade servers, mainframes, and other appropriate computers, etc. or a virtual machine thereof. In various embodiments, the client device 108 may include hardware and software 186 analogous or similar to that described in reference to the hardware and software of placement device 102.

In this context, the act of "provisioning" may include assigning a workload task 154 to a target computing device 102, and may also, in various embodiments, include providing the target computing device 102 with the data to process or execute the assigned workload task 154, changing or providing the target computing device 106 with one or more settings under which the workload task 154 is to be executed (e.g., authentication credentials, network addresses or routing information, network service or application settings (e.g., command-line parameters or arguments, INI files, Extensible Markup Language (XML) file, etc.), processor affinity, execution priority, etc.). It is understood that the above are merely a few illustrative examples to which the disclosed subject matter is not limited.

In various embodiments, the provisioning system 104 may include one or more workload tasks 154 to be assigned or provisioned to the plurality of target computing devices 106. In some embodiments, the workload tasks 154 may be stored with in a workload task DB 152.

While the example given is of a client device 108 requesting that a given workload task 154 be performed, in various embodiments, workload tasks 154 may be created and provided by a number of devices or applications. For example, a first workload task executed by a first target computing device 106 may create or request a second workload task 154 which then may be assigned to another (or the same) target computing device 106. In another embodiment, requests to execute workload tasks 154 may be occur on a predetermined schedule (e.g., a workload task that executes a database report may be executed even Friday night, etc.). While the example illustrate herein describes a request 172 that is desired to be performed as soon as possible, other requests 172 may request that a given workload task 154 may be performed at a future time or on a schedule. A version of such embodiments is discussed more in reference to FIG. 2. It is understood that the above are merely a few illustrative examples to which the disclosed subject matter is not limited.

Further, in various embodiments, the workload task request 172 may include a workload task 154. In another embodiment, a workload task request 172 may reference a preexisting workload task stored within the provisioning system 104 or another system (e.g., a pointer or link to a workload task 154 stored on another device (e.g., a server not shown, one of the target computing devices 106, etc.). It is understood that the above are merely a few illustrative examples to which the disclosed subject matter is not limited.

In various embodiments, the provisioning system 104 may include a provisioning agent 150 configured to assign a new workload task 154 (e.g., that requested by message 172) to a target computing device 106. In various embodiments, the provisioning agent 150 may also be configured to fully provision the assigned target computing device 106 as described above.

In various embodiments, the provisioning agent 150 may be configured to select a target computing device 106 such that the new workload task 154 may be executed as efficiently as possible or at least in a way that detrimental to the performance of the system 100. In such an embodiment, the provisioning agent 150 may desire to match the estimated or predicted requirements of the new workload task 154 with the capacity or spare system resources of the assigned target computing device 106. In various embodiments, multiple target computing devices 106 may meet the estimated or predicted requirements of the new workload task 154. In such an embodiment, the provisioning agent 150 may select an acceptable target computing device 106 based upon a predefined tie-breaking scheme (e.g., round-robin, random, least system resource usage, etc.). It is understood that the above are merely a few illustrative examples to which the disclosed subject matter is not limited.

In various embodiments, each workload task 154 may include or be associated with an estimated or predicted set of execution requirements. In various embodiments, these requirements may include one or more of the following: a free storage space requirement, a memory requirement, an expected number of computation or processor cycles, an supported instruction set (e.g., x86 processor architecture, a Java Virtual Machine, single-instruction, multiple-data instruction set (MMX) capable processor, etc.), required software or network services (e.g., a Tomcat web server, an SAP Enterprise Resource Planning (ERP) software, etc.), network requirements, etc. It is understood that the above are merely a few illustrative examples to which the disclosed subject matter is not limited. In one embodiment, a workload task 154 may include a classification or type, wherein the type or classification includes a set of requirements, as described above. In various embodiments, the provisioning agent 150 may take these requirements into consideration then assigning the new workload task 154 to a target computing device 106.

In the illustrated embodiment, the provisioning system 104 may request assistant in assigning the new workload task 154 to a target computing device 106 from the placement device 102. In various embodiments, the provisioning system 104 or provisioning agent 150 may send a suggestion request message 162 to the placement device 102 asking for one or more candidate target computing devices 106 that the placement device 102 thinks would be good candidates to be assigned the new workload task 154.

In various embodiments, the providing system 104 and the placement device 102 may communicate via communications protocol or an arms-length-fashion transition scheme. In some embodiments, this may take the form of a remote procedure call (RPC), application programming interface (API), or other procedural scheme. For example, in one embodiment, messages may be transmitted between the two devices 102 and 104 in a format that employs a substantially text-based messaging scheme, such as, Simple Object Access Protocol (SOAP), Web Services Description Language (WSDL), JavaScript Object Notation (JSON), XML, etc. In another embodiment, messages may be transmitted between the two devices 102 and 104 in a format that employs an at least partially binary-based messaging scheme, such as, binary RPC, binary XML, object serialization, Common Object Request Broker Architecture (CORBA), etc. In these or other various embodiments, the messages between the two devices 102 and 104 may be transmitted using a variety of protocols, such as, HTTP, HTTPS, Simple Mail Transfer Protocol (SMTP), etc. It is understood that the above are merely a few illustrative examples to which the disclosed subject matter is not limited.

In such an embodiment, the provisioning system 104 and the placement device 102 may be separated architecturally as well as geographically. In some embodiments, the provisioning system 104 and the placement device 102 may be provided by two different companies, for example. Conversely, in another embodiment, the placement device 102 and provisioning system 104 may be integrated or tightly coupled. In yet another embodiment, a single placement device 102 may service a plurality of provisioning system 104. It is understood that the above are merely a few illustrative examples to which the disclosed subject matter is not limited.

In one embodiment, the placement device 102 may include a placement engine 128 configured to suggest one or more candidate target computing devices 106 for a given or new workload task 154. In various embodiments, the placement engine 128 may be configured to examine the system resource usage profiles 122 for each or a sub-portion of the targeting computing devices 106. Based upon that examination, the placement engine 128 may suggest one or more candidate target computing devices 106 to the provisioning system 104 (via suggestion response message 164).

In one embodiment, the placement engine 128 may simply suggest the target computing device(s) 106 with the lowest system resource usage. In another embodiment, a secondary filtering or recommendation criteria may be employed (e.g., least used, least recently used, round-robin, etc.). It is understood that the above are merely a few illustrative examples to which the disclosed subject matter is not limited.

However, in various embodiments, the suggestion request message 162 may include a list or set of requirements for the workload task 154. In some embodiments, the suggestion request message 162 may include the workload task 154. In another embodiment, the suggestion request message 162 may include portions of the workload task 154. In yet another embodiment, the suggestion request message 162 may include the type of classification of the workload task 154, from which the requirements may be estimated or derived. It is understood that the above are merely a few illustrative examples to which the disclosed subject matter is not limited.

In such an embodiment, in which the placement engine 128 knows or can predict the system resource requirements of the new workload task 154, the placement engine 128 may make use of the system resource usage profiles 122 to determine which of the target computing devices 106 fulfill those requirements. In some embodiments, such requirements may also include desired or recommended "requirements" which are optional and not strictly required. In another embodiment, the requirements may include both optional requirements (which are desired but the lack thereof will not cause the execution of the workload task to fail) and mandatory requirements (the lack thereof will or is expected to cause the execution of the workload task to fail). In such an embodiment, the placement engine 128 may use the system resource usage profiles 122 to prioritize or filter the target computing devices 106 such that target computing devices 106 that include or fulfill both the optional requirements (or more of the optional requirements) and the mandatory requirements are suggested over other target computing devices 106. However, it is understood that the above are merely a few illustrative examples to which the disclosed subject matter is not limited and that other recommendation or suggestion schemes may be employed.

In the illustrated embodiment, once the placement engine 128 has determine which one or more target computing devices 106 are candidates for being assigned the new workload task 154, these suggestions may be communicated to the providing system 104 (via suggestion response message 164). In various embodiments, a more complicated communication may be employed such as FIGS. 2 and 3, as described below.

In the illustrated embodiment, the provisioning system 104 may be select one of the candidate targeting computing devices 106 suggested by the placement device 102 or, in another embodiment, another target computing device 104 entirely (disregarding in whole or part the placement device's suggestion) to be the assigned target computing device 106 which will be assigned the new workload task 154. In the illustrated embodiment, the assigned target computing device 106 may execute the new workload task 154 and provide the results or workload information 174 to the appropriate device (e.g., client device 108), which may be defined in the workload task 154 itself.

However, as described above, in various embodiments, the assignment of workload tasks 154 may be a rather dynamic environment where many workload tasks 154 are being added (assigned) and removed (completed), and the demand for system resources often changes depending on the business or network activity. Frequently, there is a time lag between the last system resource usage information 184 collection and the time at which new placement advice is needed. In this time period, numerous workload tasks 154 ay already have been provisioned or assigned to numerous target computing devices 106. Such lags or inaccuracies may cause the actual performance of the target computing devices 106 to change and not be reflective of the system resource usage profiles 122 used by the placement devices 102. It is understood that the above are merely a few illustrative examples of issues to which the disclosed subject matter is not limited.

In the illustrated embodiment, the placement device 102 may attempt to ameliorate these issues by adjusting a candidate's system resource usage profile 122 based upon an expectation that the candidate target computing device 106 will be assigned a workload task 154. The placement device 102 may assume that the provisioning system 104 will accept the placement device's 102 suggestion and adjust the candidate's system resource usage profile 122 to reflect the assignment of the new workload task 154. Again, more complex embodiments are described in regards to FIGS. 2 and 3.

In such an embodiment, the placement deice 102 may be configured to more accurately estimate the system resource usage of a target computing device in between the times in which the system resource usage information 184 is provided. As such, in various embodiments, the placement deice 102 may be configured to make better suggestions for candidate target computing devices 106. However, it is understood that the above is merely one illustrative example of a benefit to which the disclosed subject matter is not limited.

In such an embodiment, the system resource usage information 184 provided by the target computing devices 106 will now be referred to as actual system resource usage information 184. In such an embodiment, those actual system resource usage information 184 may reflect empirical or measured data as opposed to estimated or predicted system resource data.

In various embodiments, the placement device 102 may be configured to create an estimated system resource usage adjustment or information 126 based upon the new workload task 154. In one embodiment, the estimated system resource usage information 126 may be the same for each new workload task 154. In another embodiment, the estimated system resource usage information 126 may be based upon a predefined set of system resource usages for a given type or classification associated with the new workload task 154. In yet another embodiment, the estimated system resource usage information 126 may be based upon the system resource requirements associated with or included by the new workload task 154. In yet one more embodiment, the estimated system resource usage information 126 may be based upon historical system resource usages associated with the new workload task 154 or substantially similar workload tasks 154, as described below in reference to FIG. 2. It is understood that the above are merely a few illustrative examples to which the disclosed subject matter is not limited.

In various embodiments, the placement device 102 may be configured to adjust the system resource usage profile 122 of the expected assigned target computing device 106 based upon the most recent actual system resource usage information 184 and the estimated system resource usage 126 associated with the new workload task 154. In such an embodiment, the adjusted system resource usage profile 122 may include an actual or measured component and an estimated or predicted component.

In various embodiments, this adjusted system resource usage profile 122 may be used or employed by the placement engine 128 to make recommendations or suggestions for future workload tasks 154. In such an embodiment, when a new or second suggestion request 162 (with a new or second workload task 154) is received, the placement engine 128 may review the usage profiles 122. In such an embodiment, the usage profiles 122 now include the adjusted system resource usage profile 122 of the prior assigned or first target computing device 106. In such an embodiment, the placement engine 102 may effectively be kept up to date with the current status of the "real world" system resource usage of the target computing devices 106, and thus able to continue to give accurate or at least more substantially accurate advice even during the period in between an assignment of the new workload task 154 and the next or updated system resource usage information 184 from the assigned target computing device 106 or in the case of failures, as described below.

In such an embodiment, once updated actual system resource usage information 184 is provided by the assigned target computing device 106, the placement device 102 may be configured to revise the assigned target computing device's system resource usage profile 122 by removing the estimated system resource usage portion 126. Alternately, in another embodiment, the estimated system resource usage profile 122, which includes an estimated portion associated with the respective workload task 154, may simply be replaced with a new system resource usage profile 122 that does not include the estimated portion. It is understood that the above are merely a few illustrative examples to which the disclosed subject matter is not limited.

In various embodiments, instead of the receipt of a new actual system resource usage information message being the event that causes the estimated system resource usage 126 to be removed, other triggering events may cause that action. While some embodiments with such triggering events are described in more detail in regards to FIGS. 2 and 3 some examples may include: the selection by the provisioning system 104 of a target computing device 106 other than the candidate suggested by the placement device 102, a failure to properly assign or provision the workload task 154 on the assigned target computing device 106, an expiration of a predefined or heuristically determined threshold time period, etc. It is understood that the above are merely a few illustrative examples to which the disclosed subject matter is not limited.

In various embodiments, multiple workload tasks 154 may have been assigned to the same target computing device 106. In such an embodiment, as triggering events associated with the respective workload tasks 154 occur, the placement device 102 may remove the associated estimated usage portions 126 from the assigned target computing device's system resource usage profile 122. In such an embodiment, the addition and/or removal of estimated system resource portions 126 may occur in a pipelined-fashion. It is understood that the above is merely one illustrative example to which the disclosed subject matter is not limited.

FIG. 2 is a block diagram of an example embodiment of a system 200 in accordance with the disclosed subject matter. In one embodiment, the system 200 may include a placement device 202, a provisioning system 204, and a plurality of target computing devices 206. In some embodiments, the placement device 202 may include features of or be analogous to the placement device 102 of FIG. 1, the provisioning system 204 may include features of or be analogous to the provisioning system 104 of FIG. 1, and the plurality of target computing devices 206 may include features of or be analogous to the plurality of target computing devices 106 of FIG. 1. It is understood that the above is merely one illustrative example to which the disclosed subject matter is not limited.

In the illustrated embodiment, the target computing devices 206 may include a plurality of target computing devices 282, 282a, 282b, and 282c. As described above, each target computing device 206 may provide the placement device 202 with system resource information 284, 284a, 284b, and 284c, respectively.

In the illustrated embodiment, the provisioning system 204 may include a provisioning agent 250. In the illustrated embodiment, the provisioning system 204 may be given (or may include) a new workload task 254 that is to be executed by one of the target computing devices 206.

In various embodiments, the provisioning agent 250 may include an assignment engine 252 that is configured to assign the new workload task 254 to a particular one of the target computing devices 206. As described above, in such an embodiment, the assignment engine 252 may request a suggestion or recommendation from the placement device 202.

In various embodiments, the provisioning agent 250 may include a placement device interface 254 configured to communicate with the placement device 202. In various embodiments, as described above, the placement device interface 254 may be configured to send and receive messages with the placement device 202 via such protocols or schemes as API calls, RPCs, XML messages, SOAP messages, etc. It is understood that the above are merely a few illustrative examples to which the disclosed subject matter is not limited.

As described above, in various embodiments, the provisioning system 204 may transmit a suggestion request message 262 to the placement device 202. In some embodiments, the suggestion request 262 may include the new workload task 254 or portions thereof, a type or classification of the new workload task 254, or a set of system resource requirements associated with the new workload task 254. It is understood that the above are merely a few illustrative examples to which the disclosed subject matter is not limited. In the illustrated embodiment, the information provided to the placement device 202 to aid in the recommendation of candidate target computing devices 206 are illustrated as the workload task description 266.

In various embodiments, the placement device 202 may include a provisioning system interface 238 configured to communicate with the placement system 204. In various embodiments, as described above, the provisioning system interface 238 may be configured to send and receive messages with the placement device 202 via such protocols or schemes as API calls, RPCs, XML messages, SOAP messages, etc. It is understood that the above are merely a few illustrative examples to which the disclosed subject matter is not limited.

In the illustrated embodiment, the placement device 202 may include a monitoring engine 220 configured to monitoring the system resource usage of the various target computing devices 206. In the illustrated embodiment, this is shown as the monitoring engine 220 receiving the various actual system resource usage information messages 284, 284a, 284b, and 294c. It is understood that the above is merely one illustrative example to which the disclosed subject matter is not limited. As described above, in various embodiments, the monitoring engine 220 may be configured to actual system resource usage information messages 284 to create plurality of system resource usage profiles 22 for each target computing device 206.

In various embodiments, the placement device 202 may include a placement engine 228 configured to determine one or more candidate target devices 206 in response to the suggestion request 262. As described above, in various embodiments, the placement engine 228 may consult or review the information included in the system resource usage profiles 222 to select one or more candidate target computing devices 206.

In the illustrated embodiment, the target computing devices 282, 282a, and 282c may be already executing the workload tasks 284, 284a, and 294c, respectively. As a result target device 282b, which is executing nothing in the illustrated embodiment may have the lowest system resource usage or highest capacity. In the illustrated embodiment, the placement engine 228 may select the target computing device 282b as the candidate target computing device. This may be communicated to the provisioning system 204 via the suggestion response message 264.

In various embodiments, the suggestion request or workload task description 266 may include a time element such that the execution of the new workload task 254 is desired in the future, as opposed to immediately or as-soon-as-possible. In such an embodiment, the placement engine 228 may include to maintain a schedule 237. In such an embodiment, the schedule 237 may be configured to indicate when and which workload tasks are scheduled to be executed by various assigned target computing devices 206. In such an embodiment, the placement engine 228 may make use of this schedule 237 when determining an expected system resource usage for each of the target computing devices 206 at the time at which the new workload task 254 desires to execute.

In another embodiment, the system resource usage profiles 222 may include a time element or dimension. In such an embodiment, the system usage profiles 222 may include expected or historical system resource usages for various timeframes (e.g., hourly, daily, weekly etc.). In such an embodiment, the schedule 237 may not exist. Alternatively, in one embodiment, the schedule 237 may indicate to the placement engine 228, or other portion of the placement device 202, when a new workload task 254 is scheduled to be assigned within the system 200. It is understood that the above are merely a few illustrative examples to which the disclosed subject matter is not limited.

As described above, in various embodiments, once the placement device 202 considers the new workload task 254 to be assigned to an assigned target computing device (e.g., target computing device 282b), the placement device 202 may adjust the respective system resource usage profile 222 with the estimated system resource usage information 226. As described above, in some embodiments, the estimated system resource usage information 226 may be based directly on the workload task description 266.

In some embodiments, the placement device 202 may include a usage estimator 230 that is configured to estimate the system resource usage that will be incurred by the new workload task 254. In one embodiment, the usage estimator 230 may be configured to compute or estimate the amount of system resource usage are actually incurred by the execution of various workload tasks.

In such an embodiment, the usage estimator 230 may determine the difference in the system resource usage information 284 for a given target computing device 282 before a workload task is assigned and executed and the system resource usage information 284 for the given target computing device 282 after the workload task was assigned and during its execution. In some embodiments, this difference may be attributed to the respective workload task. In various embodiments, these system resource usage amounts may be saved as a plurality of workload task system resource usages 234. It is understood that the above is merely one illustrative example of estimating the amount of system resource used by a workload task to which the disclosed subject matter is not limited.

In such an embodiment, the usage estimator 230 may be configured to determine which of the historical workload task system resource usages 234 most closely match or are sufficiently similar to the current new workload task 254. In various embodiments, this determination may be based upon a set of predefined matching criteria 236. In some embodiments, these may include matching based upon the type or classification of the new workload task 254, a user or device that created or caused the new workload task 254 to be executed, the type of service being deployed, and any user-selected parameters, etc. It is understood that the above are merely a few illustrative examples to which the disclosed subject matter is not limited.

In such an embodiment, the usage estimator 230 may generate the estimated system resource usage 226 for the new workload task 254 not off a predefined set of system resource requirements or workload type profile. Instead, in some embodiments, the estimated system resource usage 226 may be based off an historical model of workload system resource usage 234 for a similar workload task or workload tasks.

In various embodiments, the new workload task 254 is provisioned based upon a predefined deployment model with a fixed allocation of system resources (e.g., processor, memory, and disk space, etc.). However, in some embodiments, once deployed or executed by the target computing device 206, the workload task's actual system resource usage may be variable. The workload task 254 may not use its full allotment of the system resources. In some embodiments, the actual system resource usage due to the new workload task 254 may be lower than described in the workload description 266 most of the time. In the illustrated embodiment, by basing the adjusted system resource usage profile 222 on a historically based estimate usage portion 226 (instead of a less accurate predefined estimate usage portion) money may be saved as the system 200 may be put to work more efficiently.

In some embodiments, after receiving the suggestion response message 264, the assignment engine 252 may decide which target computing device 206 will be assigned the new workload task 254. As described above, in various embodiments, the placement device 206 may simply assume that everything has occurred correctly and its suggestion was taken by the provisioning system 204. In such an embodiment, the usage profile of the candidate target computing device (e.g., device 284b) may be adjusted with the estimated system resource usage 226.

However, in the illustrated embodiment, the assignment engine 252 may be configured to inform the placement device 202 exactly what target computing device 206 the provisioning agent has chosen as the assigned target computing device (e.g., via assignment message(s) 268). It is understood that the assignment engine is under no obligation to accept the placement device's recommendation.

For example, the placement device 202 may have recommended a first target computing device 282b, but the assignment engine 252 (for whatever reasons) may have assigned the new workload task 254 to a second target computing device 282a. In such an embodiment, the assignment engine 252 may inform the placement device 202 of this choice. In such an embodiment, the placement device 202 may not adjust the system resource usage profile 222 associated with the failed candidate (device 282b), but instead the system resource usage profile 222 associated with the selected assigned device 282a.

In some embodiments, the placement device may still provisionally adjust the system resource usage profile 222 associated with the suggested candidate (device 282b) immediately after the suggestion is made or determined. However, once an official assignment (by the provisioning system 204) is made the erroneous adjust of the system resource usage profile 222 associated with the suggested candidate may be revoked or removed, and a new adjustment to the system resource usage profile 222 associated with the selected assigned target computing device made. It is understood that the above are merely a few illustrative examples to which the disclosed subject matter is not limited.

In various embodiments, whenever a workload task is provisioned on a particular target host (e.g., computing device 282b), a token 243 called a Pending Provisioning Action may be created within the placement device 202 for this provisioning action. In such an embodiment, until the placement device 202 collects, from the assigned computing device 282b, system resource usage data 282b that includes the performance impact of that new workload task 254, the placement device 202 simulates workload task's system resource impact via the estimated usage portion 226.

As described above, this estimated usage portion 226 may be included within the adjusted system resource usage profile 222 until a triggering event 242 occurs. As described above, the triggering event 242 may include a next or subsequent system resource usage information message, an assignment message 268 that indicates a different computing device 206 was assigned the workload task 254, an activation message 268 indicating that the assignment of the new workload task 254 failed or was not properly accomplished, not receiving an activation message 268 within a time period in which one is expected, an expiration of a period of time (e.g., an expected amount of time needed to properly provision the new workload task 254 on the assigned computing device), etc. It is understood that the above are merely a few illustrative examples to which the disclosed subject matter is not limited.

In various embodiments, the provisioning agent 250 may include a provisioning engine 256 configured to provision the assigned target computing device 206 (e.g., target computing device 282b). In such an embodiment, the provisioning engine 256 may be configured to actually schedule or cause to occur the execution of the new workload task 254. As described above, in embodiments in which the new workload task execution is to be delayed until a time in the future, the provisioning engine 256 may be configured to delay the provisioning of that workload task 254 until the appointed time.

FIG. 3 is a timing diagram of an example embodiment of a system 300 in accordance with the disclosed subject matter. In various embodiments, the system 300 may include a placement device 302, a provisioning device 304, and one or more target computing devices 306, as described above.

In the illustrated embodiment, the communication between the placement device 302 and the provisioning device 304 may primarily include three phases: an Advice or Recommendation phase 392, a Reservation phase 394, and an Activation phase 396. In various embodiments, one or more of these phases may be absent or combined. In another embodiment, additional phases may be included. It is understood that the above is merely one illustrative example to which the disclosed subject matter is not limited.

In such an embodiment, the Advice phase 392 may include providing a suggestion or recommendation to the provisioning device 304. In various embodiments, during the Advice phase 392 the Placement Engine 302 may choose one or more of the possible target computing device 306 for placing the new workload. During this phase 392, the Provisioning System 304 may still be free to ignore the advice if it chooses to. The Provisioning System 304, in various embodiments, may employ different criteria for placement, and these criteria may be computed using different placement engines, business logic, etc.

In various embodiments, the Reservation phase 394 may include providing the placement device 302 with an indication as to which target computing device was selected as the assigned target computing device. In one embodiment, where the Provisioning System 304 has decided to place the workload on a particular target computing device 306. This may or may not be the same target computing device that the Placement Engine 302 chose or suggested. It is understood that the above is merely one illustrative example to which the disclosed subject matter is not limited.

In various embodiments, the Activation phase 396 may include providing the placement device 302 with an indication that the new workload task has been successfully assigned or provisioning on the assigned target computing device 306. In such an embodiment, the Provisioning System 304 may have successful completed provisioning of the workload.

As described above and illustrated by Block 310, in various embodiments, the placement device 302 may monitor the system resource usage or capacity of the plurality of target computing devices 306. As described above, this monitoring may occur at periodic intervals, after various triggering events, or via other schemes.

In various embodiments, the provisioning system may send a placement or suggestion request 312 to the placement device 302, as described above. In such an embodiment, the placement request 312 may include a description, in whole or part, of the new workload task that the provisioning system 304 wishes advice about. In some embodiments, the placement request 312 may include a request for multiple workload tasks. In one such embodiment, the placement request 312 may request individual recommendations for each workload task. In another embodiment, placement request 312 may request a suggestion for where to place all or various sub-portions of the multiple workload tasks.

In various embodiments, the placement request 312 may include a list of possible target computing devices 306 from which the placement device 302 may select a recommendation. In such an embodiment, the provisioning device 304 may limit the choice of sub-portion of the full plurality of target computing devices 306. In some embodiments, the provisioning device 304 may be configured to pre-filter the plurality of target computing devices 306 based upon various requirements of the workload task (e.g., software requirements, a tenant model in a multi-tenant computing system, etc.). In such an embodiment, the placement device 302 may only be configured to monitor the hardware system resources or other aspects of the plurality of target computing devices 306. It is understood that the above are merely a few illustrative examples to which the disclosed subject matter is not limited.

Block 314 illustrates that, in one embodiment, the placement device 302 may be configured to determine which one or more target computing devices 306 are to be suggested or recommend as candidates for the assignment of the workload task, as described above.

In various embodiments, the placement device 302 may transmit a placement recommendation 316 to the provisioning system 304, as described above. In some embodiments, the placement recommendation 316 may include multiple candidate target computing devices 306. In various embodiments, these multiple candidate target computing devices 306 may be ordered by preference, given a score or other preference indicator, associated with a "reason" why the placement device 302 is suggesting a given placement device 302, etc. It is understood that the above are merely a few illustrative examples to which the disclosed subject matter is not limited.

Action 318 illustrates that, in one embodiment, the provisioning system 304 may select a candidate target computing device to become the assigned target computing device 306. As described above, in various embodiments, the provisioning system 304 may not select the candidate target computing device recommended by the placement device 302.

In various embodiments, the provisioning system 304 may be configured to provide the placement device 302 with an indication as to which target computing device 306 was selected to be assigned the workload task. In the illustrated embodiment, this occurs via a reservation message 320. In one such embodiment, the reservation message 320 may include a description of the workload task and an indication as to which target computing device 306 was selected as the assigned target computing device 306 in block 318. As described above, in some embodiments, the provisioning system 304 may not communicate this information and the placement device 302 may make an assumption regarding the selection made in action 318. In various embodiments, the placement device 302 may be configured to acknowledge the preservation message 320 via the reservation acknowledgement 322.

In some embodiments, the placement device 302 may be configured to adjust the assigned target computing device's system resource usage profile using an estimated or simulated system resource usage model, as described above and shown in Block 324. In various embodiments, the reservation acknowledgement 322 may occur after the action of Block 324, substantially simultaneously with the action of Block 324, or before the action of Block 324. It is understood that the above are merely a few illustrative examples to which the disclosed subject matter is not limited.

In various embodiments, after the provisioning system 304 has selected the assigned target computing device (via action 318) the workload task may be assigned or provisioned to or on the assigned target computing device. In various embodiments, this may occur via a single message or series of messages collectively illustrated as the provision or assignment protocol 326.

In some embodiments, the assignment may occur without error and the provisioning system 304 may inform the placement device 302 that the workload has been correctly assigned to the assigned target computing device 306 via the activation message 330. In various embodiments, the activation message 330 may include a description of identifier (ID) of the associated workload task and/or the assigned target computing device. In some embodiments, an activation acknowledgment message 332 may be transmitted form the placement device 302 in response to the activation message 330.

As described above, in various embodiments, once a successful activation message 330 has been received, the placement device 302 may remove the estimated or simulated system resource usage (from block 324) from the assigned target computing device's system resource profile after the next monitoring device update (illustrated by Block 310*b*). This removal or re-adjustment of the assigned target computing device's system resource profile is illustrated by Action 334. As described above, once a system monitoring event occurs that includes the actual workload task system resource usage, a historical workload task usage profile may be generated to aid future estimation or simulations of similar workload task system resource usage in the future.

In various embodiments, the assignment of the workload task to the assigned target computing device 306 may not occur as smoothly as described above. The following provides a few example embodiments in which various errors or corrections may be made. It is understood that the below are merely a few illustrative examples to which the disclosed subject matter is not limited.

In one embodiment, the assigned target computing device of the activated message 330 may differ from the assigned target computing device of the reservation message 320. For example, in one such embodiment, the attempt to assign the workload task to the intended or first target computing device may have failed and the provisioning system 304 may have then assigned the workload task to an alternate target computing device. In one such embodiment, this change may be communicated via the activated message 330. In another embodiment, this change may be communicated by transmitting a new reservation message 320 and subsequent activation message 330.

In such embodiments, upon being notified of the change in assigned target computing device 306, the placement engine may remove the estimated system resource usage from the old, failed, or deprecated target computing device's system resource usage profile and then added the estimated system resource usage to the new target computing device's system resource usage profile. As described above, once a new actual system resource usage update for the target computing device becomes available (e.g., via block 310*b*) to the placement engine 302, the placement engine 302 may discard the simulation due to the workload tasks that were properly provisioned, in favor of the actual system resource usage data from the target computing devices 306. In such an embodiment, the actual system resource usage data is expected to include the effect of the provisioned workload task, so it may not be needed to continue to maintain the simulated or estimated system resource usage.

In various embodiments, the reservation and activation phases 394 and 396 together allow that the provisioning system 304 and the placement device 302 to coordinate their knowledge about the identity of the workload task that was provisioned and the target computing device 306 where it was placed. This may be useful, in various embodiments, for the placement device 302 to know, so that it can continue to provide accurate advice until the next performance data feed becomes available for the chosen target computing device.

In another variation of the illustrated embodiment, the provisioning system 304 may begin the provisioning process 326, but the process may fail. In such an embodiment, the activation message 330 may include an indication that the activation failed (e.g., a "FailedActivation" call in the API). In such an embodiment, the placement device 302 may be configured to remove the estimated or simulated system resource usage (of action 324). In one embodiment in which the estimation makes use of a token-based system, the placement device 302 may discard the "pending provisioning action" token and clean up respective data structures associated with the pending provisioning action and the provisionally assigned target computing device (illustrated by action 334*a*). In various embodiments, this may assure that the capacity of or system resource usage the chosen target computing device is again available for provisioning new workloads. It is understood that the above is merely one illustrative example to which the disclosed subject matter is not limited.

In yet another embodiment, some portion of the placement or provisioning actives may fail before provisioning is fully completed. In such an embodiment, even after the failed device(s) recover, the placement device 302 may never receive an activation message or call 330. In some embodiments, due to this failure the estimated system resource usage may continue to be used forever. In another embodiment, to handle this failure case, the placement device 302 may be configured to time out the estimated system resource usage or pending provisioning action token after a predefined or heuristically computed time has elapsed. In some embodiments, time period may be estimated using historical data for how long it takes to provision various kinds of workload tasks, plus how long it takes for the performance feed or monitoring tool to become available to the placement device 302. It is understood that the above is merely one illustrative example to which the disclosed subject matter is not limited. In various embodiments, in which no activation message 330 exits or is normally provided to the placement device 302, such a time out scheme may be normal technique for determining when to perform action 334.

In some embodiments, a monitoring devices action 310*a* may naturally occur between the action 324 of adjusting the system resource usage profile of the assignee computing device and the triggering event (e.g., activation message 330) that causes the estimated system resource usage due to the workload task to be removed from the system resource usage profile of the assignee computing device. In one such embodiment, the actual system resource information from the assigned computing device 306 may be ignored and the adjusted system resource usage profile may be used instead (until the triggering event). In another embodiment, the placement device 302 may be configured to replace the prior actual system resource information from the assigned computing device 306 with the new actual system resource information from the assigned computing device 306, creating an updated and adjusted system resource profile. In such an embodiment, the estimated system resource usage may continue to be used as it may be assumed that the workload task was not yet properly provisioned and therefore had no influence on the new actual system resource information. In yet another less preferred embodiment, the new actual system resource information may be compared to the adjusted system resource profile to determine if the actual system resource information comports with the adjusted system resource profile and implies that the workload task has been provisioned and is now reflected in the new actual system resource information. It is understood that the above are merely a few illustrative examples to which the disclosed subject matter is not limited.

FIG. 4 is a flow chart of an example embodiment of a technique 400 in accordance with the disclosed subject matter. In various embodiments, the technique 400 may be used or produced by the systems such as those of FIGS. 1, 2, or 3. Furthermore, portions of technique 400 may be used to produce a timing diagram such as that of FIG. 3. Although, it is understood that the above are merely a few illustrative examples to which the disclosed subject matter is not limited.

Block 402 illustrates that, in one embodiment, the actual system resource usage of each of a plurality of target computing devices may be monitored, as described above. In various embodiments, each of the plurality of target computing devices may be configured to execute one or more respective workload tasks, as described above. In various embodiments, monitoring the actual system resource usage of each of the plurality of target computing devices may include monitoring in a periodic fashion, as described above. In various embodiments, one or more of the action(s) illustrated by this Block may be performed by the apparatuses or systems of FIGS. 1, 2, or 3, the placement device of FIGS. 1, 2, or 3, or the monitoring engine of FIGS. 1 or 2, as described above.

Block 404 illustrates that, in one embodiment, a request may be received, from a provisioning system, for a suggestion for an assigned target computing device to be assigned a new workload task, as described above. In various embodiments, the suggested target computing device may include one or more of the plurality of target computing devices, as described above. In some embodiments, the request for a suggestion for an assigned target computing device to be assigned a new workload task may include a time in the future when the new workload task is expected to be assigned, as described above. In various embodiments, one or more of the action(s) illustrated by this Block may be performed by the apparatuses or systems of FIGS. 1, 2, or 3, the placement device of FIGS. 1, 2, or 3, or the placement engine of FIGS. 1 or 2, as described above.

Block 406 illustrates that, in one embodiment, a suggestion may be provided regarding the assigned target computing device to be assigned a new workload task, as described above. In various embodiments, the suggestion may include a suggestion of one or more of the plurality of targeted computing devices, as described above. In various embodiments, providing to the provisioning system, the suggestion regarding the assigned target computing device may include providing a suggestion that a first targeting computing device be assigned the new workload task, as described above. In another embodiment, providing the suggestion regarding the assigned target computing device to be assigned a new workload task may include a suggestion that any of a plurality of candidate target computing devices be assigned a new workload task, as described above. In such an embodiment, the plurality of candidate target computing devices may include a subset of the plurality of target computing devices, as described above. In various embodiments, one or more of the action(s) illustrated by this Block may be performed by the apparatuses or systems of FIGS. 1, 2, or 3, the placement device of FIGS. 1, 2, or 3, or the placement engine of FIGS. 1 or 2, as described above.

Block 408 illustrates that, in one embodiment, an estimated system resource usage of the new workload task may be estimated based, at least in part, upon a historical analysis of one or more workload tasks sufficiently similar, based on a predefined set of criteria, to the new workload task, as described above. In various embodiments, one or more of the action(s) illustrated by this Block may be performed by the apparatuses or systems of FIGS. 1, 2, or 3, the placement device of FIGS. 1, 2, or 3, the placement engine of FIG. 1, the usage estimator of FIG. 2, as described above.

Block 410 illustrates that, in one embodiment, a system resource usage profile of the assigned target computing device may be adjusted to include an estimated system resource usage for the new workload task and an actual system resource usage of the assigned target computing device that was previously monitored, as described above. In various embodiments, adjusting a system resource usage profile of an assigned target computing device may include adjusting the system resource usage profile of the assigned target computing device at the time in the future when the new workload task is expected to be assigned, as described above. In various embodiments, one or more of the action(s) illustrated by this Block may be performed by the apparatuses or systems of FIGS. 1, 2, or 3, the placement device of FIGS. 1, 2, or 3, the placement engine of FIG. 1, the usage estimator of FIG. 2, as described above.

Block 412 illustrates that, in one embodiment, an activation message may be received, wherein the message includes an indication of which target computing devices the providing system selected as the assigned target computing device and to be assigned the new workload task, as described above. As described above, in some embodiments, the suggestion regarding the assigned target computing device may have included a suggestion that a first targeting computing device be assigned the new workload task. In some embodiments, receiving the activation message may include an indication that a second target computing device was selected to be assigned the new workload task, as described above. In such an embodiment, adjusting the system resource usage profile of the assigned target computing device may include adjusting the system resource usage profile of the second target computing device, as described above. In various embodiments, one or more of the action(s) illustrated by this Block may be performed by the apparatuses or systems of FIGS. 1, 2, or 3, the placement device of FIGS. 1, 2, or 3, the placement engine of FIG. 1, the usage estimator of FIG. 2, as described above.

Block 414 illustrates that, in one embodiment, a failed activation message may be received that indicates that an attempt to assign new workload task to the assigned target computing device was unsuccessful, as described above. In various embodiments, one or more of the action(s) illustrated by this Block may be performed by the apparatuses or systems of FIGS. 1, 2, or 3, the placement device of FIGS. 1, 2, or 3, or the placement engine of FIGS. 1 or 2, as described above.

Block 416, illustrates that, in one embodiment, the estimated system resource usage of the new workload task may be removed from the system resource usage profile of the assigned target computing device, as described above. In some embodiments, this may occur after a triggering event, as described above. In various embodiments, the triggering event may include a next periodic monitoring of the assigned target computing device after the new workload task was assigned, as described above. In another embodiment, the triggering event may include an expiration of a predetermined period of time, wherein the predetermined period of time is based, at least in part, upon an estimated amount of time between providing the suggestion regarding the assigned target computing device to be assigned a new workload task and when the assigned target computing device begins executing the new workload task, as described above. In yet another embodiment, the triggering event may include the reception of the failed activation message, as described above. In such an embodiment, after the failed activation message has been received, the estimated system resource usage of the new workload task may be removed from the system resource usage profile, as described above. In various embodiments, one or more of the action(s) illustrated by this Block may be performed by the apparatuses or systems of FIGS. 1, 2, or 3, the placement device of FIGS. 1, 2, or 3, the placement engine of FIG. 1, the usage estimator of FIG. 2, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
monitoring, for each of a plurality of target computing devices configured to execute at least one workload task, usage of a respective plurality of resources included in each of the plurality of target computing devices;
associating a respective system resource profile with each of the plurality of target computing devices, each respective system resource profile including data indicative of the monitored usage of the respective plurality of resources included in each of the plurality of target computing devices;
receiving, from a provisioning system, a request for a suggestion of an assignment for a new workload task to at least one of the plurality of target computing devices;
estimating an amount of usage, by the new workload task, of at least one of the respective plurality of resources included in each of the plurality of target computing devices;
providing, to the provisioning system, the suggestion identifying at least one of the plurality of target computing devices as a target computing device for assignment of the new workload task, the suggestion based on the estimated amount of usage of at least one of the respective plurality of resources included in each of the plurality of target computing device and the monitored usage of the respective plurality of resources included in each of the plurality of target computing devices; and adjusting the respective system resource profile associated with the assigned target computing device to include the estimated amount of usage, by the new workload task, of at least one of the respective plurality of resources included in the assigned target computing device.

2. The method of claim 1, further comprising:
after a triggering event has occurred, adjusting the respective system resource profile associated with the assigned target computing device to remove the estimated amount of usage, by the new workload task, of the at least one of the respective plurality of resources included in the assigned target computing device.

3. The method of claim 2,
wherein the monitoring of the usage of the respective plurality of resources included in each of the plurality of target computing devices includes monitoring each of the target computing devices in a periodic fashion; and
wherein the triggering event includes a next periodic monitoring of the assigned target computing device after the new workload task was assigned.

4. The method of claim 2, wherein the triggering event includes an expiration of a predetermined period of time, wherein the predetermined period of time is based, at least in part, upon an estimated amount of time between providing the suggestion regarding the assigned target computing device to be assigned a new workload task and when the assigned target computing device begins executing the new workload task.

5. The method of claim 1,
wherein the request for a suggestion for an assignment for a new workload task to at least one of the plurality of target computing devices includes a future time when the new workload task is expected to be assigned; and
wherein the adjusting of the respective system resource profile associated with the assigned target computing device includes adjusting the respective system resource profile associated with the assigned target computing device at the future time when the new workload task is expected to be assigned.

6. The method of claim 1, further including receiving an activation message that includes an indication of which of the plurality of target computing devices the provisioning system selected as the assigned target computing device to be assigned the new workload task.

7. The method of claim 6,
wherein the providing to the provisioning system of the suggestion identifying at least one of the plurality of target computing devices as a target computing device for assignment of the new workload task further includes providing a suggestion that a first target computing device be assigned the new workload task;
wherein the receiving of the activation message further includes receiving an indication that a second target computing device was selected to be assigned the new workload task; and
wherein the adjusting of the respective system resource profile associated with the assigned target computing device further includes adjusting a respective system resource profile associated with the second target computing device.

8. The method of claim 1, wherein the estimating of the amount of usage, by the new workload task, of at least one of the respective plurality of resources included in each of the assigned target computing devices is based, at least in part, upon a historical analysis of one or more workload tasks sufficiently similar, based on a predefined set of criteria, to the new workload task.

9. The method of claim 1, wherein the providing to the provisioning system of the suggestion identifying at least one of the plurality of target computing devices as a target computing device for assignment of the new workload task includes providing a suggestion that any of a plurality of candidate target computing devices be assigned the new workload task, wherein the plurality of candidate target computing devices includes a subset of the plurality of target computing devices.

10. An apparatus comprising:
a network interface configured to:
receive monitoring messages for each of a plurality of target computing devices configured to execute at least one workload task, the monitoring messages including data indicative of monitored usage of a respective plurality of resources included in each of the plurality of target computing devices;
receive, from a provisioning system, a request for a suggestion of an assignment for a new workload task to at least one of the plurality of target computing devices; and
provide to the provisioning system, the suggestion identifying at least one of the plurality of target computing devices as a target computing device for assignment of the new workload task; and
a processor configured to:
associate a respective system resource profile with each of the plurality of target computing devices, each respective system resource profile including data indicative of the monitored usage of the respective plurality of resources included in each of the plurality of target computing devices;
estimate an amount of usage, by the new workload task, of at least one of the respective plurality of resources included in each of the plurality of target computing devices;
determine the suggestion based on the estimated amount of usage of at least one of the respective plurality of resources included in each of the plurality of target computing devices and the data indicative of the monitored usage of the respective plurality of resources included in each of the plurality of target computing devices; and
adjust the respective system resource profile associated with the assigned target computing device to include the estimated amount of usage, by the new workload task, of at least one of the respective plurality of resources included in the assigned target computing device.

11. The apparatus of claim 10, wherein the processor is configured to:
after a triggering event has occurred, adjust the respective system resource profile associated with the assigned target computing device to remove the estimated amount of usage, by the new workload task, of the at least one of the respective plurality of resources included in the assigned target computing device.

12. The apparatus of claim 11, wherein the monitoring messages are received in a periodic fashion; and wherein the triggering event includes a next periodic monitoring of the assigned target computing device after the new workload task was assigned.

13. The apparatus of claim 10,
wherein the request for a suggestion for an assignment for a new workload task to at least one of the plurality of target computing devices includes a future time when the new workload task is expected to be assigned; and wherein the processor is further configured to adjust the respective system resource profile associated with the assigned target computing device at the future time when the new workload task is expected to be assigned.

14. The apparatus of claim 10, wherein the network interface is configured to:
receive an activation message that includes an indication of which of the plurality of target computing devices the provisioning system selected as the assigned target computing device to be assigned the new workload task.

15. The apparatus of claim 14, wherein the network interface is configured to:
provide a suggestion that a first target computing device be assigned the new workload task; and
wherein the activation message further includes an indication that a second target computing device was selected to be assigned the new workload task; and
wherein the processor is configured to adjust a respective system resource profile associated with the second target computing device.

16. The apparatus of claim 14, wherein the network interface is configured to:
receive a failed activation message that indicates that an attempt to assign the new workload task to the assigned target computing device was unsuccessful; and
wherein the processor is configured to adjust the respective system resource profile associated with the assigned target computing device to remove the estimated amount of usage, by the new workload task, of the at least one of the respective plurality of resources included in the assigned target computing device after the failed activation message has been received.

17. The apparatus of claim 10, wherein the estimating of the amount of usage, by the new workload task, of at least one of the respective plurality of resources included in each of the assigned target computing devices is based, at least in part, upon a historical analysis of one or more workload tasks sufficiently similar, based on a predefined set of criteria, to the new workload task.

18. The apparatus of claim 10, wherein the suggestion identifying at least one of the plurality of target computing devices as a target computing device for assignment of the new workload task includes a suggestion that any of a plurality of candidate target computing devices be assigned the new workload task, wherein the plurality of candidate target computing devices includes a subset of the plurality of target computing devices.

19. A computer program product for recommending a target computing system, the computer program product being stored on a non-transitory computer-readable storage medium and including executable code that, when executed, is configured to cause an apparatus to:
monitor, for each of a plurality of target computing devices configured to execute at least one workload task, usage of a respective plurality of resources included in each of the plurality of target computing devices;
associate a respective system resource profile with each of the plurality of target computing devices, each respective system resource profile including data indicative of the monitored usage of the respective plurality of resources included in each of the plurality of target computing devices;
receive, from a provisioning system, a request for a suggestion of an assignment for a new workload task to at least one of the plurality of target computing devices;
estimate an amount of usage, by the new workload task, of at least one of the respective plurality of resources included in each of the plurality of target computing devices;
provide, to the provisioning system, the suggestion identifying at least one of the plurality of target computing devices as a target computing device for assignment of the new workload task, the suggestion based on the estimated amount of usage of at least one of the respective plurality of resources included in each of the plurality of target computing device and the monitored usage of the respective plurality of resources included in each of the plurality of target computing devices; and
adjust the respective system resource profile associated with the assigned target computing device to include the estimated amount of usage, by the new workload task, of at least one of the respective plurality of resources included in the assigned target computing device.

20. The computer program product of claim 19, wherein the executable code, when executed, is configured to cause an apparatus to:
after a triggering event has occurred, adjust the respective system resource profile associated with the assigned target computing device to remove the estimated amount of usage, by the new workload task, of the at least one of the respective plurality of resources included in the assigned target computing device.

* * * * *